(12) United States Patent
Satoh et al.

(10) Patent No.: US 6,657,941 B1
(45) Date of Patent: Dec. 2, 2003

(54) RECORDING/REPRODUCING DEVICE

(75) Inventors: Isao Satoh, Osaka (JP); Kazunori Kono, Hirakata (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/763,554

(22) PCT Filed: Sep. 1, 1999

(86) PCT No.: PCT/JP99/04755

§ 371 (c)(1),
(2), (4) Date: Feb. 23, 2001

(87) PCT Pub. No.: WO00/14737

PCT Pub. Date: Mar. 16, 2000

(30) Foreign Application Priority Data

Sep. 7, 1998 (JP) .......................................... 10-251687

(51) Int. Cl.[7] .............................................. G11B 33/02
(52) U.S. Cl. ...................................... 369/77.2; 369/75.1
(58) Field of Search ............................... 369/77.2, 75.1

(56) References Cited

U.S. PATENT DOCUMENTS 5,523,907 A * 6/1996 Seo et al. ................... 360/96.5
5,999,364 A * 12/1999 Aoki et al. ................. 360/96.6
6,038,202 A * 3/2000 Kanatani et al. ........... 369/77.2

FOREIGN PATENT DOCUMENTS

| EP | 0 249 389 | 12/1987 |
|---|---|---|
| JP | 11-167761 | 6/1999 |
| JP | 11-312353 | 11/1999 |

\* cited by examiner

Primary Examiner—A. J. Heinz
Assistant Examiner—Mark Blouin
(74) Attorney, Agent, or Firm—Parkhurst & Wendel, L.L.P.

(57) ABSTRACT

A recording/reproducing device which is thinner when it is loaded with and without a cartridge, except while a cartridge is being inserted or taken out. A first cabinet (2) incorporates recording/reproducing means and has an opened top. A second cabinet (1) is so connected to the first cabinet (2) as to close the opening of the first cabinet (2). The second cabinet is so fitted in the first cabinet (2) as to sink in the thickness of the first cabinet (2) as shown in FIG. 1(b) when a cartridge (7) is loaded and not loaded therein, except while the cartridge (7) is being inserted or taken out. While the cartridge (7) is inserted or taken out, the second cabinet (1) is separated by a distance d from the first cabinet (2) as shown in FIG. 1(a), thereby defining an opening through which the cartridge (7) is inserted/taken out.

8 Claims, 15 Drawing Sheets

(a)

(b)

(a)

(b)

(a)

(b)

(a)

(b)

RECORDING/REPRODUCING DEVICE

TECHNICAL FIELD

The present invention relates to a recording/reproducing device configured such that a cartridge is slidably inserted and set in an insertion port formed in a side surface of a cabinet.

BACKGROUND ART

An example of a recording/reproducing device using a cartridge is a portable minidisk player.

For the portable minidisk player (hereafter referred to as a "portable MD"), a conventional device will be described below with reference to drawings.

First, a first example of the conventional device is shown in FIG. 14. That is, a cover cabinet 51 of the portable MD is supported on the side of a body cabinet 52 of the portable MD so as to be rotationally movable around a rotational-movement support point 53 from an open position shown by the solid line to a blocked position shown by the imaginary line, and the body cabinet 52 incorporates a disk rotation driving mechanism 54 and an optical pickup 55 (for both components, see FIG. 14(b)). Additionally, the cover cabinet 51 has a holder 56 mounted thereon. Accordingly, when the cover cabinet 51 is placed in the open position, an MD cartridge 57 is then inserted into the holder 56, and under these conditions, the cover cabinet 51 is blocked up, a disk incorporated in the cartridge 57 is connected to the disk rotation driving mechanism 54, on the side of a body cabinet 52 is rotationally driven, and is then accessed by the optical pickup 55.

In the portable MD of the first conventional example configured as described above, an operation of removing or inserting the cartridge 57 will be explained.

First, to remove the cartridge 57, and to open the cover cabinet 51 an open operation button 58 is slid to disengage a lock claw 59 from the cover cabinet 51 and opposite side surfaces 51a and 51b of the cover cabinet 51 are gripped and lifted. Then, the cover cabinet 51 rotationally moves to cause the cartridge 57 to jump to the solid-line position in FIG. 14(a), so that a user grips the cartridge by his or her fingers and pulls it out.

Further, to insert the cartridge 57, the open operation button 58 is slid with the cover cabinet 51 placed at the blocked position shown by a virtual line, thereby disengaging the lock claw 59 from the cover cabinet 51. The cover cabinet 51 is then gripped and lifted in such a way as to rotationally move around the rotational-movement support point 53. The cartridge 57 is subsequently inserted into the holder 56 and the cover cabinet 51 is then closed.

Next, a second example of the conventional device is disclosed in Japanese Patent Laid-Open No. 9-223386 specification. This is configured as shown in FIG. 15.

FIG. 15(a) is a sectional view showing a loaded state where a cartridge has been completely inserted. FIG. 15(b) is a view showing that a cartridge is being inserted or removed. In this example, an MD cartridge 63 is slidably inserted through an opening 62 formed in a side surface of a cabinet 61 and is removed when it is slidably discharged through the opening 62 by operating an eject operation dial (not illustrated).

That is, the cabinet 61 internally has a vertically moving cartridge holder 64, and a disk rotation driving mechanism 66, an optical pickup 67, or the like provided on a chassis 65.

The cartridge holder 64 is configured so as to move upward and downward between a position in FIG. 15(b) where the cartridge 63 can be inserted through the opening 62 and a loaded state where the cartridge 63 can be loaded on the disk rotation driving mechanism 66 for recording/reproduction. Reference numeral 68 denotes a cover provided over the opening 62 and which is opened and closed in connection with the operation of the eject operation dial.

The operation of removing or loading the cartridge in this configuration will be described. First, to remove the cartridge 63 from the state in FIG. 15(a), the eject operation is performed to lift the cartridge holder 64 up to the position in FIG. 15(b) and the cartridge 63 is then discharged from the position shown in FIG. 15(b) based on an urging force (not shown) for discharging the cartridge.

The cartridge holder 64 must be lifted in order to release the cartridge 63 from the disk rotation driving mechanism 66, in which the cartridge 63 has been fitted, thereby preventing the disk rotation driving mechanism 66 from hindering sliding of the cartridge 63.

Further, to load the cartridge 63, the cover 68 is opened, the cartridge 63 is inserted, and the cartridge holder 64 is lowered at the position where the cartridge 63 has been completely inserted, as shown in FIG. 15(b). Then, the state in FIG. 15(a) is obtained to completely load the cartridge 63 in the device.

In the above conventional example, first, in the first example shown in FIG. 14, the opening and closing of the cover cabinet 51 and the removal of the cartridge 57 require the operations of gripping and opening the side surfaces 51a and 51b of the cover cabinet 51 and of inserting the user's fingers to grip the cartridge. Thus, the device cannot be operated easily.

Additionally, the second example shown in FIG. 15 allows the device to be operated more easily than the first example. However, while the cabinet in the first example has an overall thickness (the body 51 and the cover 52) T (the dimension on the disk rotation driving mechanism 54 in the cabinet corresponds to the thickness of the MD cartridge 57 and holder 56), the cabinet in the second example has an overall thickness larger than that in the first example by an amount corresponding to the dimension S over which the cartridge holder 64 moves upward and downward. Thinner portable MDs are thus expected to be developed.

DISCLOSURE OF INVENTION

It is an object of the present invention to provide a recording/reproducing device which can be easily operated because it is configured such that a cartridge is slidably inserted and set in an insertion port formed in a side surface of a cabinet and which can be configured so as to be thinner when the cartridge is not being loaded or removed for insertion or takeout, that is, when the cartridge is out of the device or has been completely loaded.

The recording/reproducing device according to the present invention is characterized in that a second cabinet covering an opening in a first cabinet is connected the first cabinet having a recording/reproducing means and the opening formed at its top in such a manner that at least a part of the second cabinet sinks within the range of the thickness of the first cabinet when the cartridge is not being loaded or removed for insertion or takeout, that is, when the cartridge is out of the device or has been completely loaded, and in that when the cartridge is moved in or out, the second cabinet moves in the thickness direction of the first cabinet, while an insert port in the cartridge is opened.

According to the present invention, the second cabinet partly sinks into the first cabinet to make the device thinner when the cartridge is not being loaded or removed for insertion or takeout, that is, when the cartridge is out of the device or has been completely loaded.

The recording/reproducing device according to a first characteristic of the present invention includes: a first cabinet having a recording/reproducing means for a recording medium housed in a cartridge; a second cabinet connected to the first cabinet so as to movable from a first position where the second cabinet is located closer to the first cabinet in a thickness direction thereof to a second position where the second cabinet is separated from the first cabinet, the second cabinet preferably having a holder integrally connected thereto; urging means for normally urging the second cabinet toward the first position where the second cabinet is located closer to the first cabinet, an opening means for moving the second cabinet in a direction in which the second cabinet moves from the first position to the second position against an urging force from the urging means; and an insertion port which is opened when the opening means separates the second cabinet from the first cabinet. The insertion port is opened when the opening means moves the second cabinet to the second position, and preferably has an insertion port cover for blocking the insertion port. The insertion port cover forms a lip-shaped opening abutting portion having an inclined portion which enables the cartridge to be abutted against and inserted into the insertion port.

According to this device, only when the opening means opens the insertion port, the second cabinet is moved from the first portion where it is located closer to the first cabinet to the second position against the urging force from the urging means before the cartridge is loaded or removed (that is, inserted or taken out), thereby enabling the cartridge to be more easily loaded in or removed from the cabinets. Further, when the cartridge is not being loaded or removed for insertion or takeout, that is, when the cartridge is out of the device or has been completely loaded, the second cabinet is located closer to the first cabinet in the thickness direction thereof, thereby making the total thickness of the cabinets smaller. Furthermore, due to the insertion port cover forming the lip-shaped opening abutting portion cooperating with the opening means, the insertion port cover can be opened to allow the cartridge to be inserted thereinto, simply by abutting the cartridge directly against the insertion port cover and pushing it in the port.

Additionally, the device comprises detection means for detecting that the cartridge is being housed and locking means for locking the opening means using the detection means, thereby preventing another cartridge from being inserted when the above cartridge is already housed.

Further, the cabinet comprises an open operation button provided on its front side surface and which cooperates with the opening means so that the insertion port can be opened by operating the open operation button, thereby allowing the cartridge to be more easily taken out.

Furthermore, the device comprises detection means for detecting that the cartridge is being housed and locking means for locking the opening means using the detection means. A position where the open operation button cooperating with the locked opening means is stopped depends on whether or not the cartridge is housed so that whether or not the cartridge is present can be displayed on an insertion port surface depending on the stop position of the open operation button.

Additionally, the locked state of the opening means established by the locking means while the cartridge is housed can be cleared to open the insertion port only when the open operation button is operated for opening, thereby avoiding mistakenly inserting another cartridge.

Further, the device comprises second cartridge-discharging urging means in a second cabinet for urging the housed cartridge in a direction in which it is discharged so that when the opening means moves the second cabinet from the first position to the second position for separation, the second urging means discharges the housed cartridge, thereby enabling the device to be more easily operated when the cartridge is taken out.

According to a second characteristic of the present invention, there is provided a recording/reproducing device in which an opening and closing cover attached to an insertion port is opened so that a cartridge can be slidably inserted and set in a holder, and the device includes: a first cabinet having recording/reproducing means for a recording medium housed in the cartridge; a second cabinet attached to the first cabinet so as to be movable between a first position where the second cabinet is located opposite and close to the recording/reproducing means of the first cabinet and a second position where the second cabinet is separated from the recording/reproducing means; a holder moving integrally with the second cabinet to receive, at the second position, the cartridge inserted from an insertion port and transferring the cartridge to the first position, where the cartridge is subjected to recording/reproduction by means of the recording/reproducing means; first urging means for urging the second cabinet and the holder to the first position where the second cabinet and the holder are located closer to the recording/reproducing means of the first cabinet and where the cartridge can be subjected to recording/ reproduction; second cartridge-discharging urging means for urging the cartridge in a direction in which the cartridge is discharged from the holder; an insertion port cover attached to the insertion port in the holder and urged in a direction in which the insertion port is blocked; and cover opening means operative, for moving the second cabinet to the second position to open the cover against an urging force of the first urging means acting in a direction toward the first position of the second cabinet when the insertion port cover is released. This device is characterized in that after the opening means has opened the insertion port cover and when the second cabinet is at the second position, the cartridge is inserted and in that after the cartridge has been completely inserted, the first urging means applies the urging force to move the second cabinet to thereby close the insertion port cover.

BEST MODE FOR CARRYING OUT THE INVENTION

An embodiment of the present invention will be described below with reference to FIGS. 1 to 12.

Figure 1:
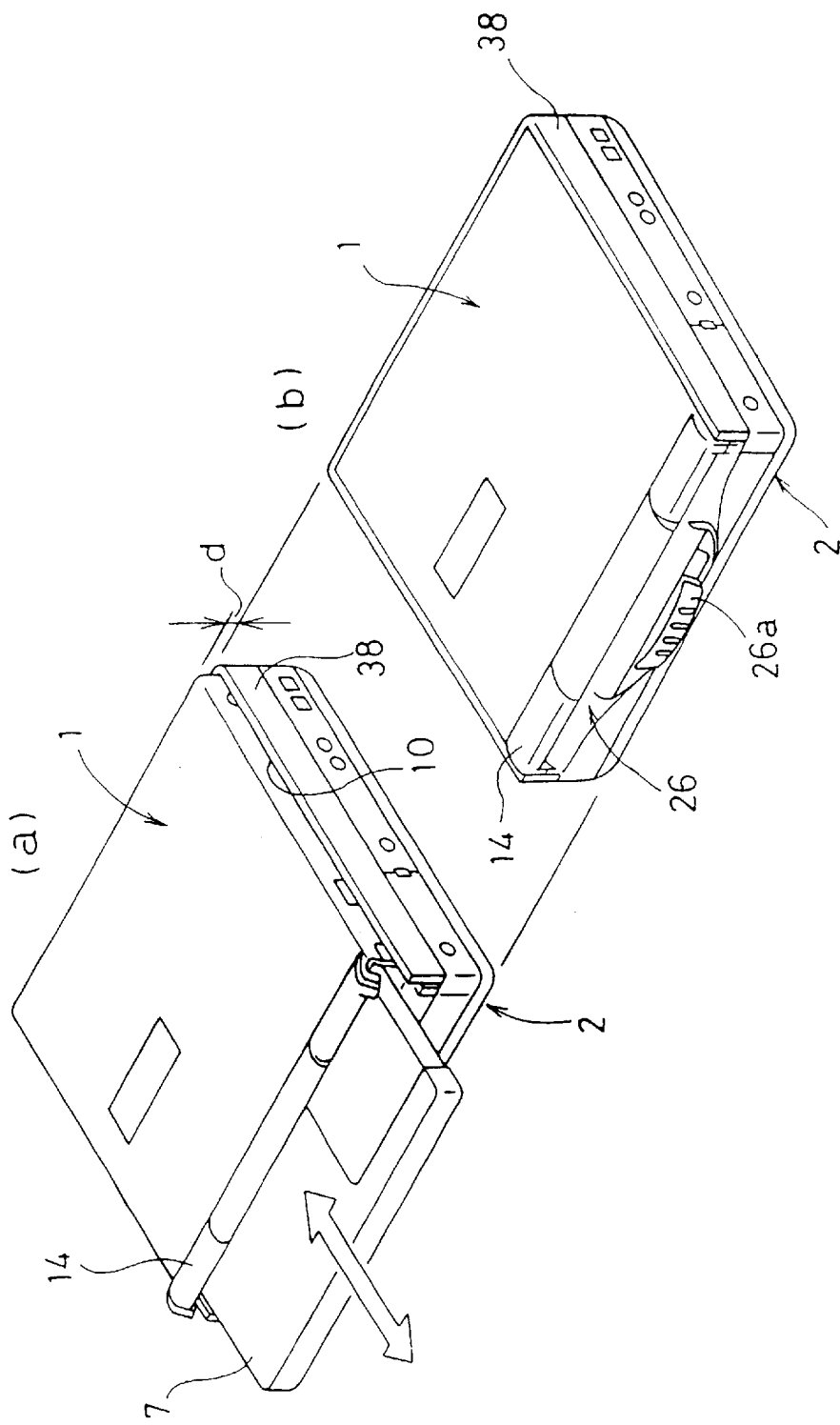
FIG. 1 is a perspective view showing that a cartridge is being loaded in or removed from an MD player according to an embodiment of a recording/reproducing device of the present invention and that the cartridge is out of the MD player or has been completely loaded therein.
Figure 2:
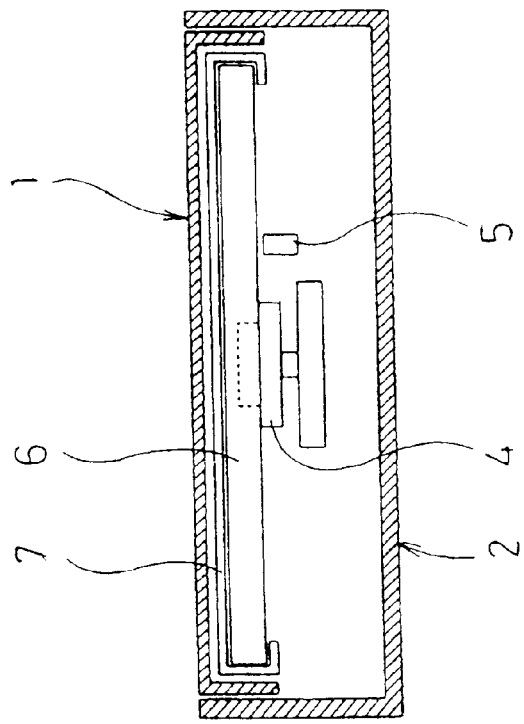
FIG. 2 is a sectional view of this embodiment.
Figure 2:
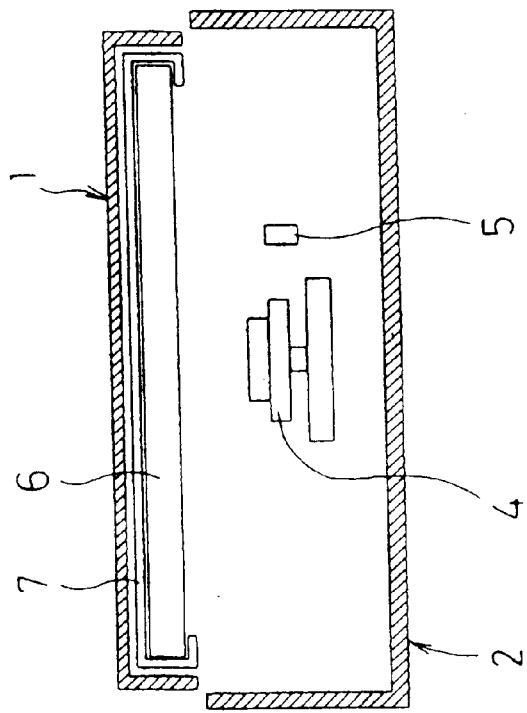

FIGS. 1 and 2 show an MD player comprising a cover opening and closing device of the present invention.

With this MD player, only when a cartridge 7 is being loaded or removed, a movable cabinet 1 with a holder 6 moves upward from a top opening 10 in a body cabinet 2 over a distance corresponding to a projection amount d as shown in FIGS. 1(a) and 2(a). When the cartridge is not being loaded or removed for insertion or takeout, that is, when the cartridge is out of the device or has been completely loaded (including the period of recording/reproduction), the movable cabinet 1 moves into the body cabinet 2 in a fashion sinking therein, that is, the movable cabinet is located closer to the body cabinet 2 in a cabinet thickness direction, as shown in FIGS. 1(b) and 2(b).

When the movable cabinet 1 sinks into the body cabinet 2 to load the cartridge 7, a disk incorporated in the cartridge 7 is connected to a disk rotation driving mechanism 4. in the body cabinet 2 and then rotationally driven so that an optical pickup 5 can access the disk. In an operation state where the cartridge 7 is loaded, the portable MD can have the same thickness as when the cartridge 7 is not loaded. Accordingly, the present invention provides a thinner MD player.

A specific structure for attaching the movable cabinet 1 to the body cabinet 2 and a specific structure for enabling the cartridge 7 to be operated more easily during loading and removal than in the prior art will be described below with reference to FIGS. 3 to 13.

Figure 3:
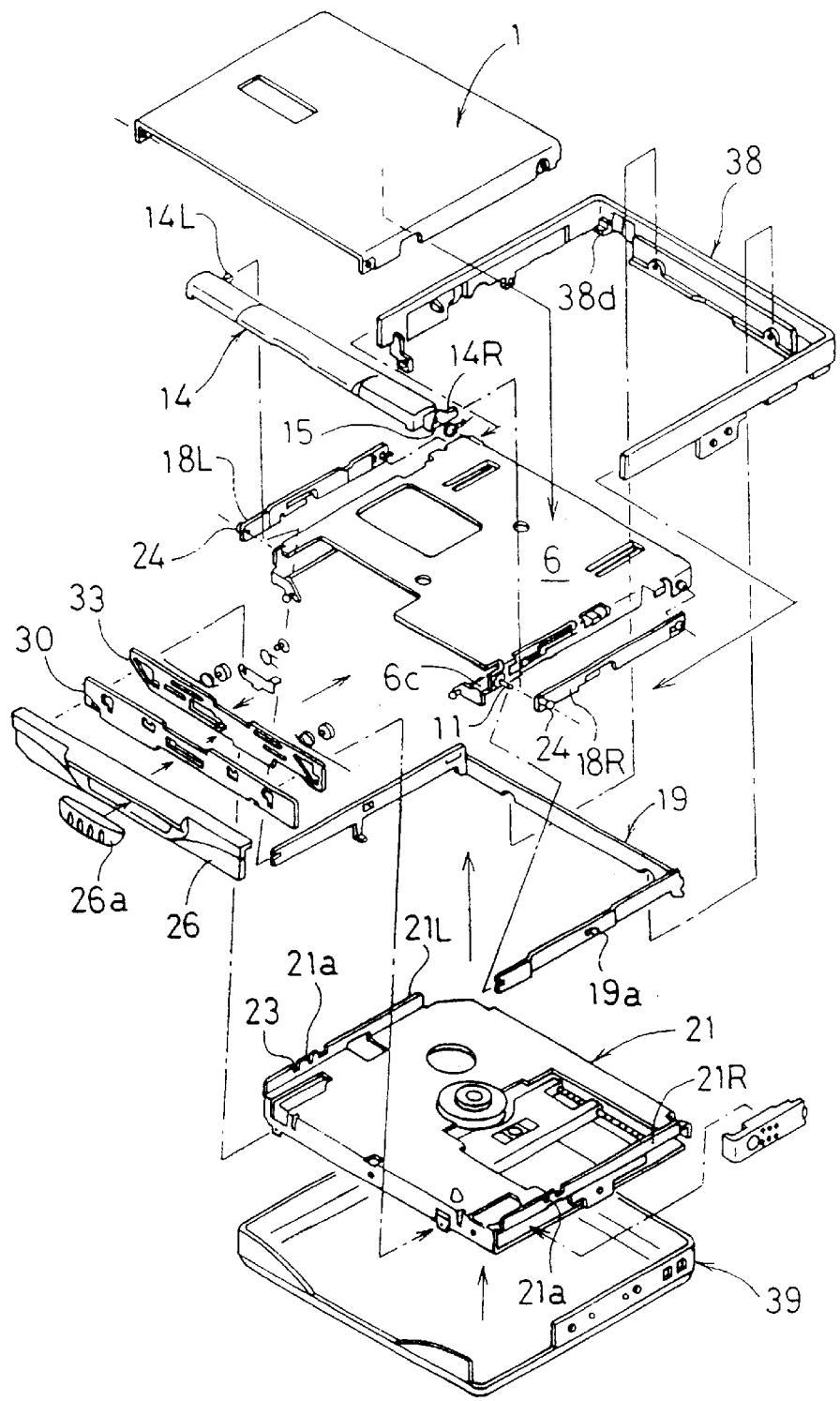
FIG. 3 is an exploded perspective view of this embodiment.
Figure 4:
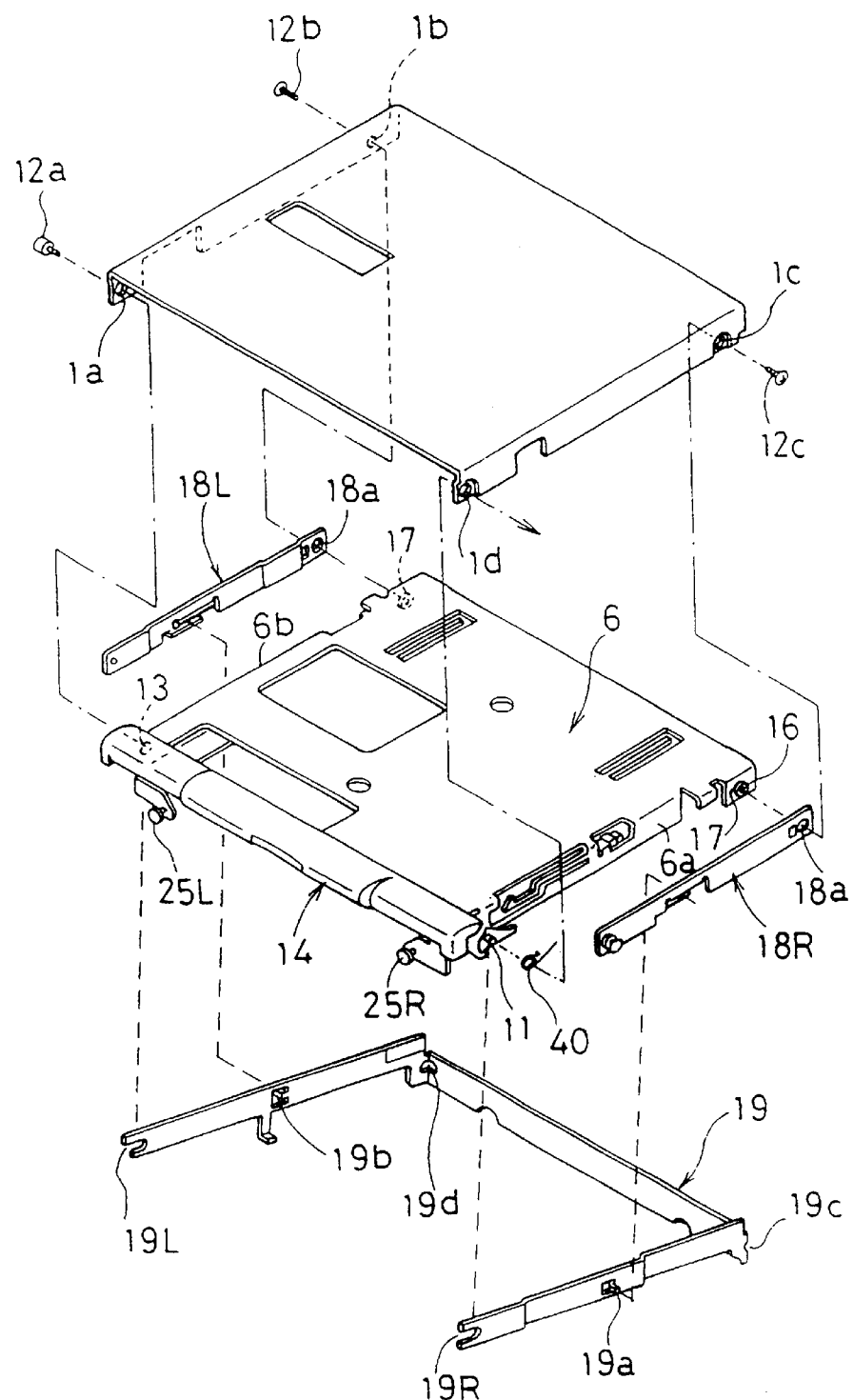
FIG. 4 is an exploded perspective view of a movable cabinet, a holder, and their peripheries according to this embodiment.

FIG. 3 is an exploded perspective view of a portable MD. The movable cabinet 1 and the holder 6 are assembled together as shown in FIG. 4.

Both side surfaces 6a and 6b of the holder 6 has a support shaft 11 loaded in a right side surface 6a thereof near an insertion port 6c therein and has a tapped hole 13 formed in a left side surface 6b at the corresponding position and in which a screw 12a is screwed. An insertion port cover 14 for opening and closing the insertion port 6c in the holder 6 has support arms 14L and 14R formed on laterally opposite sides thereof, with a through-slot 15 formed halfway between the support arms 14L and 14R.

When the movable cabinet 1 is placed on the holder 6 and the screw 12a and screws 12b and 12c are screwed in the holder 6 through holes 1a, 1b, and 1c in the movable cabinet 1, the support shaft 11 of the holder 6 is inserted through the through-slot 15 in the support arm 14R of the insertion port cover 14, and a tip of the support shaft 11 is inserted through a hole 1d in the movable cabinet 1.

The screw 12a is screwed into the tapped hole 13 in the holder 6 from the hole 1a in the movable cabinet 1 through the through-slot 15 in the support arm 14L, and the insertion port cover 14 has both sides thereof rotationally movably supported on the holder 6 by means of the support shaft 11 and the screw 12a.

When the screws 12b and 12c are screwed into a tapped hole 16 in the holder 6 from the holes 1b and 1c located at an rear end of the movable cabinet 1, boss portions 17 formed at a rear end of the holder 6 are inserted through holes 18a drilled in proximal end portions of link plates 18R and 18L, and the screws 12b and 12c are screwed into the tapped hole 16 formed in the center of the boss portions 17 to rotationally movably support the link plates 18R and 18L in such a manner as to prevent them from slipping out from the holder 6.

An engaging slit 19R formed at a right end of a U-shaped link angle 19 engages with the support shaft 11 of the holder 6 at a position sandwiched between an inner side of the movable cabinet 1 and the support arm 14R. An engaging slit 19L formed at a left end of the link angle 19 engages with the screw 12a at a position sandwiched between the support arm 14L and the holder 6.

When the link plates 18R and 18L and the link angle 19 are assembled together as described above, an engaging piece 19a formed in the link angle 19 by means of a cutting and raising operation engages with a slit portion 20 formed in an intermediate portion of the link plate 18R, while an engaging piece 19b formed in the link angle 19 by means of a cutting and raising operation similarly engages with a slit portion formed in an intermediate portion of the link plate 18L.

Figure 5:
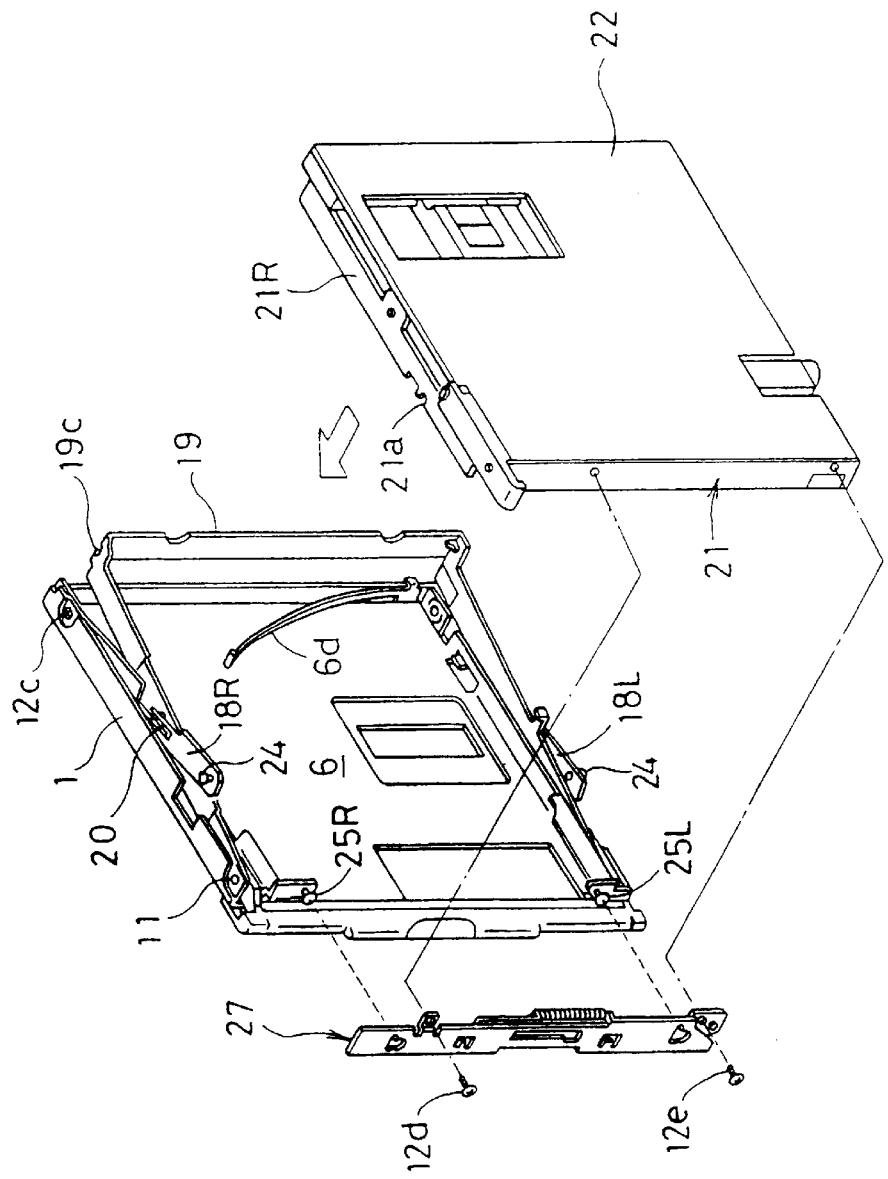
FIG. 5 is a perspective view showing how a chassis is assembled on an assembly of the movable cabinet and the holder according to this embodiment.

A chassis 21, shown in FIGS. 5 and 1, has the disk rotation driving mechanism 4, the optical pickup 5, and a printed circuit board 22 assembled thereon. A right folded piece 21R and a left folded piece 21L of the chassis 21 each have an attaching slit 21a, and the left folded piece 21L further has a notch portion 23 formed before the attaching slit 21a.

Figure 7:
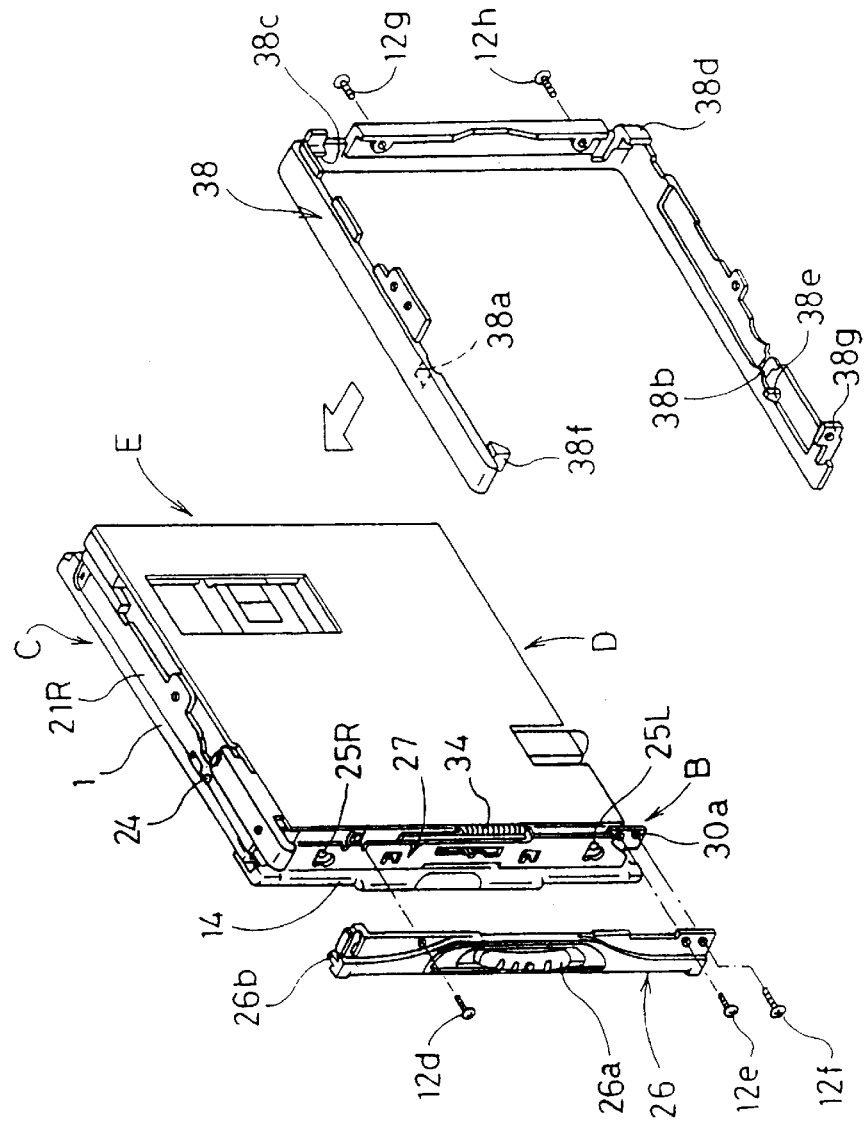
FIG. 7 is an exploded perspective view showing how a front panel and a middle cabinet are attached to each other according to this embodiment.

The chassis 21 and the movable cabinet block assembled in FIG. 4 are combined together such that the movable cabinet 1 is located inside the right folded piece 21R and the left folded piece 21L of the chassis 21 and such that rotation support shafts 24 loaded at tips of the link plates 18R and 18L engage with the attaching slits 21a in the right folded piece 21R and in the left folded piece 21L of the chassis 21 as shown in FIGS. 5 and 7.

Figure 6:
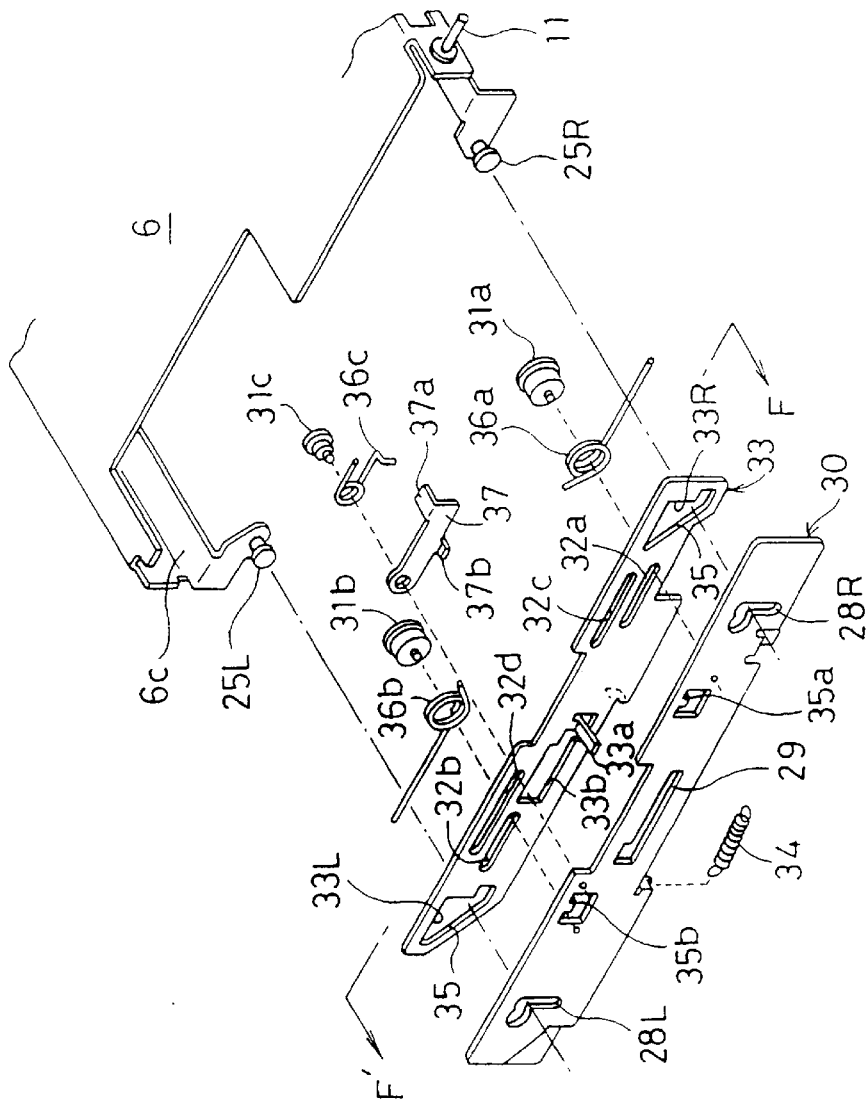
FIG. 6 is an exploded perspective view of a locking means of the holder according to this embodiment.

As shown in FIGS. 5 and 6, the holder 6 has a holder guide shaft 25R loaded at a right front end thereof and a holder guide shaft 25L loaded at a left front end thereof. The holder guide shafts 25R and 25L engage with an ascend and descend driving unit 27 tightly attached to a front surface portion of the chassis 21 together with a front cabinet 26 using screws 12d and 12e.

The ascend and descend driving unit 27 comprises an upper and a lower guide slots 28R and 28L defining movement paths for the holder guide shafts 25R and 25L of the holder 6, an ascend and descend guide plate 30 having a lever shaft inserting slot 29 formed in a central portion thereof, and a slide plate 33 having elongate slots 32a and 32b through which pins 31a and 31b are inserted, the slide plate 33 slidably overlapping the ascend and descend guide plate 30, as shown in FIG. 6. The pins 31a and 31b are pressed in the ascend and descend guide plate 30.

Figure 10:
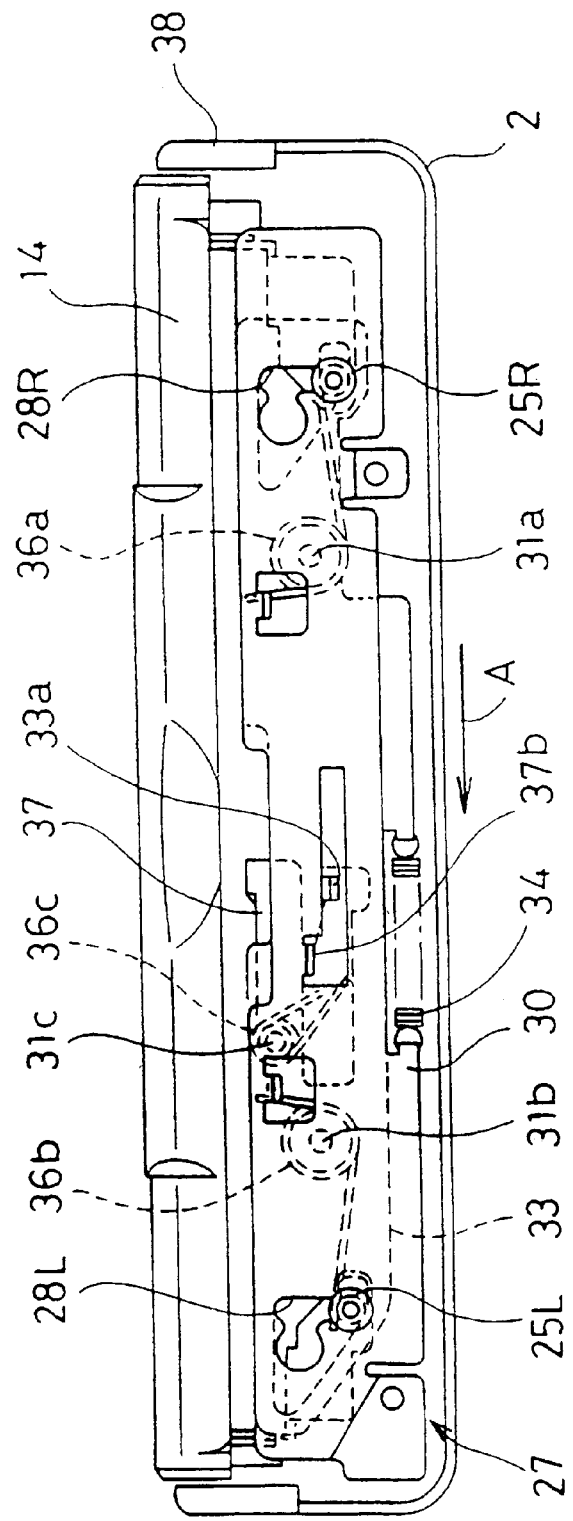
FIG. 10 is a front sectional view showing how the locking means operates before the cartridge is inserted according to this embodiment.

A tensile coil spring 34 is interposed between the ascend and descend guide plate 30 and the slide plate 33 so that the slide plate 33 is urged leftward (the direction shown by arrow A) as shown in FIG. 10.

Figure 8:
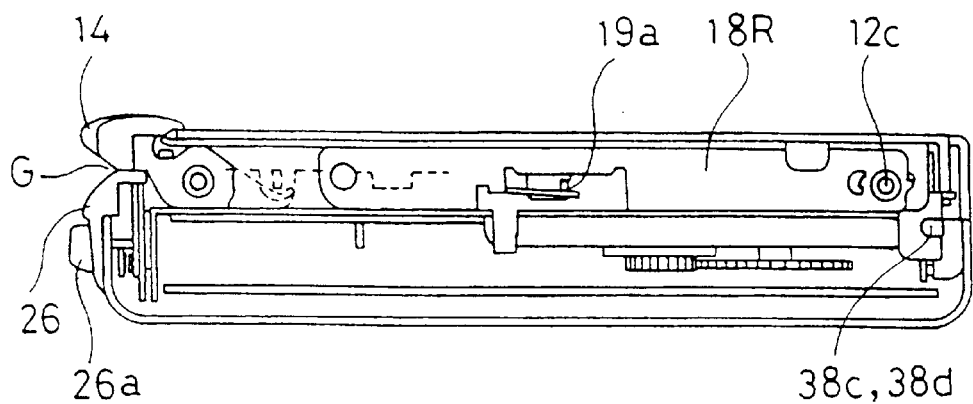
FIG. 8 is a side sectional view of this embodiment.
Figure 8:
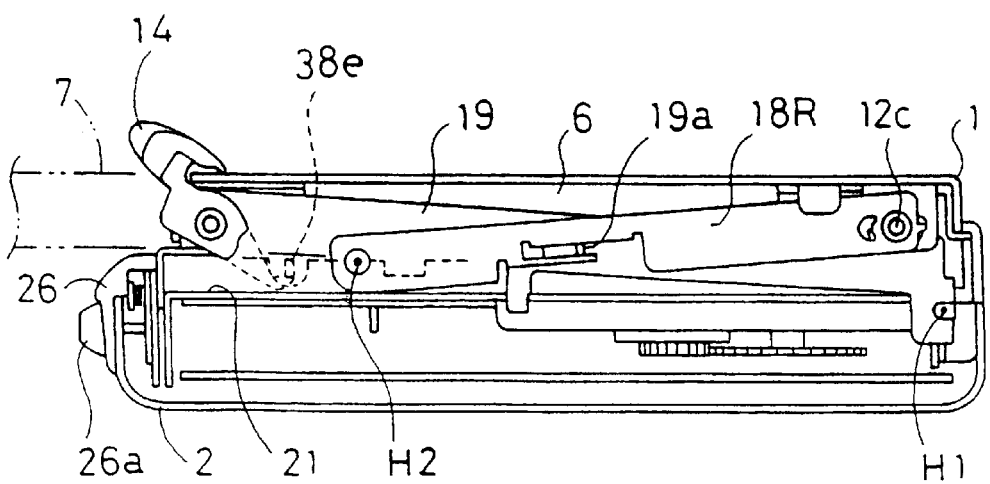
Figure 9:
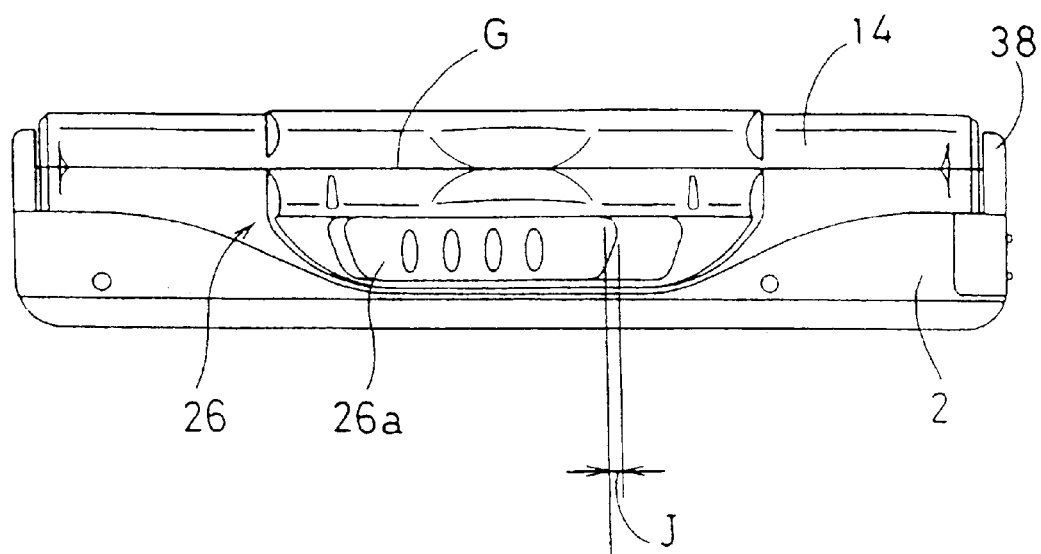
FIG. 9 is a front view showing that the cartridge is being loaded in or removed and that the cartridge is out of the MD player or has been completely loaded therein.
Figure 9:
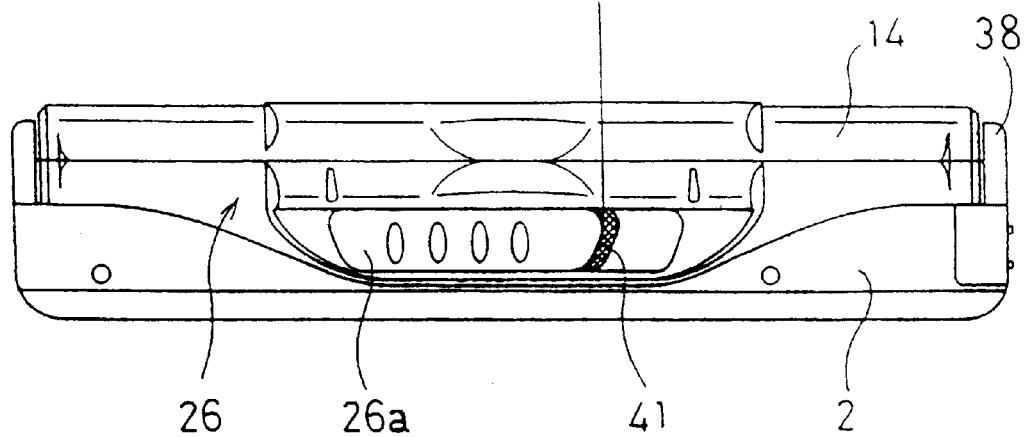

An operation lever 33a formed in the center of the slide plate 33 by means of a folding operation penetrates the lever shaft inserting slot 29 in the ascend and descend guide plate 30 and engages with an open operation button 26a slidably attached to the front cabinet 26 as shown in FIGS. 1, 8, and 9.

The slide plate 33 has through-slots 33R and 33L formed at opposite ends thereof and through which the holder guide shafts 25R and 25L engaging with the vertical guide slots 28R and 28L as shown in FIG. 6 are inserted, and the through-slots 33R and 33L each partly have an inclined side 35 formed therein.

Further, the slide plate 33 has elongate slots 32c and 32d formed in parallel with the elongate slots 32a and 32b and through which folded pieces 35a and 35b formed by folding corresponding portions of the ascend and descend guide plate 30 toward the slide plate 33. Torsion coil springs 36a and 36b having their center penetrated by the pins 31a and 31b, respectively, are interposed between the folded pieces 35a and 35b, penetrating the elongate slots 32c and 32d, and the holder guide shafts 25R and 25L, as shown in FIG. 10.

Furthermore, a pin 31c inserted through the elongate slot 32d in the side plate 33 and pressed in the ascend and descend guide plate 30 has a detection lever 37 attached thereto and having its tip 37a urged upward by the torsion coil spring 36c so that the tip of the detection lever 37 comes into contact with the loaded cartridge 7 and is then rotationally moved downward against an urging force of the torsion coil spring 36c.

A U-shaped intermediate cabinet 38 is attached to an assembly having the ascend and descend driving unit 27 assembled therein as described above in such a manner that the intermediate cabinet 38 covers both side surfaces C and D and a rear surface E of the assembly while not covering a front surface B to which the ascend and descend driving unit 27 is attached as shown in FIG. 7. The intermediate cabinet 38 has recess portions 38a and 38b formed on inside opposite ends thereof, for regulating the positions of the rotation support shafts 24 of the link plates 18R and 18L which are engaged with the engaging slots 21a in the chassis 21 so as to prevent the shafts 24 from moving in a direction in which the shafts 24 slip out. The intermediate cabinet 38 has projection portions 38c and 38d formed on inner sides of a rear surface thereof and engaging with the notch portions 19c and 19d formed in corners of the link angle 19 as shown in FIGS. 5, 7, and 8. Furthermore, the intermediate cabinet 38 has a projection 38e formed on an inner side of a left side surface 38L at a position closer to the front of the intermediate cabinet than the recess portion 38b so that a tip of the projection 38e passes through the notch portion 23 formed in the left folded piece 21L of the chassis 21 and then engages with a tip of the support arm 14L of the insertion port cover 14 as shown in FIG. 8.

A right tip 38f of the intermediate cabinet 38 is engaged with and locked on a projection 26b projecting from a right end of the rear surface of the front cabinet 26, and a left tip 38g of the intermediate cabinet 38 is fixed in a hole 30a in the ascend and-descend guide plate 30 using a screw 12f.

The rear surface of the intermediate cabinet 38 is tightly fixed to the chassis together with the link angle 19 and a bottom cover 39 using screws 12g and 12h.

FIGS. 8(a) and 9(a) show how the components have been assembled together. In this state, as shown in FIG. 10, the movable cabinet 1 and the holder 6 are urged by the torsion coil springs 36a and 36b to a descended position (FIG. 1(b)) where the movable cabinet 1 and the holder 6 are located closer to the chassis 21. A torsion coil spring 40 having its center penetrated by the support shaft 11 of the holder 6 is interposed between the chassis 21 and the support arm 14R of the insertion port cover 14, with the insertion port cover 14 urged to a blocked portion by the torsion coil spring 40, as shown in FIG. 4.

Figure 13:
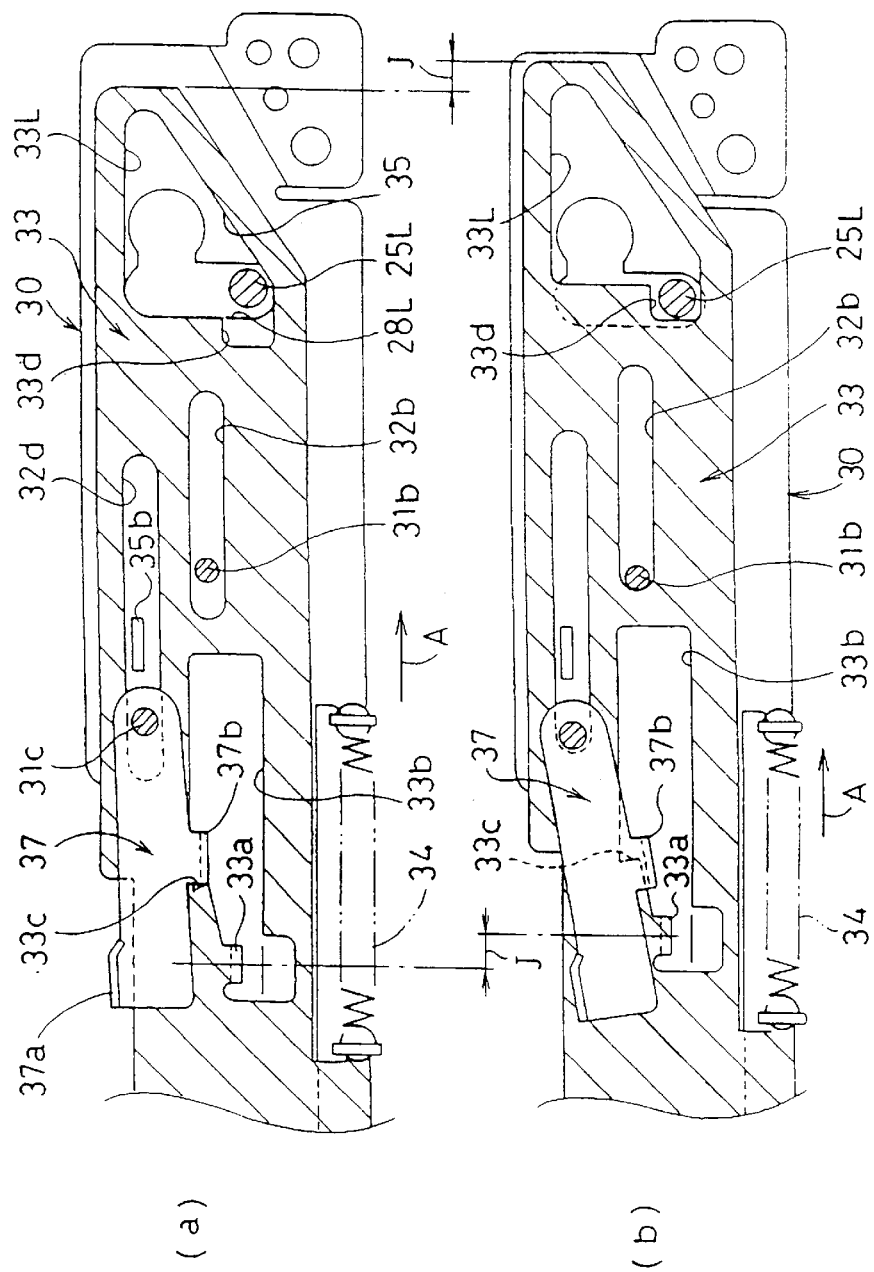
FIG. 13 is an enlarged rear view of an integral part of the locking means showing how the locking means operates before and after the cartridge is inserted according to this embodiment.
Figure 14:
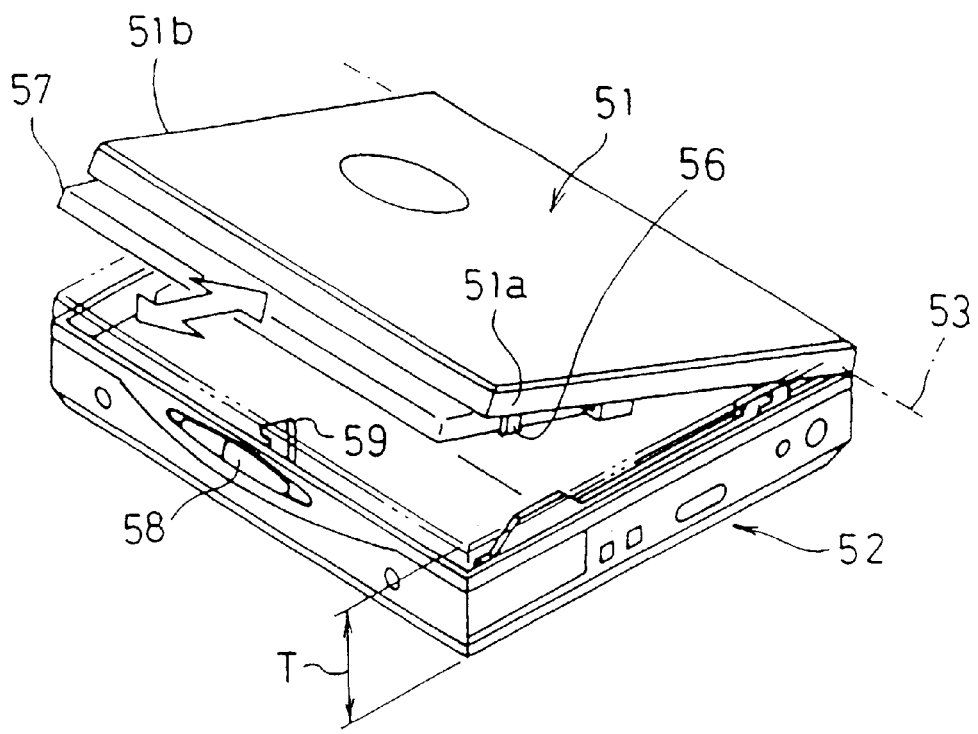
FIG. 14 is a perspective view and a sectional view of a conventional MD player.
Figure 14:
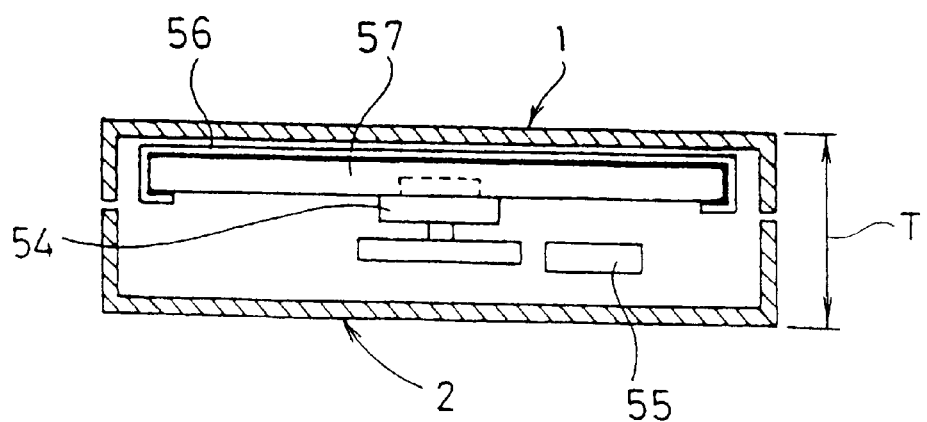
Figure 15:
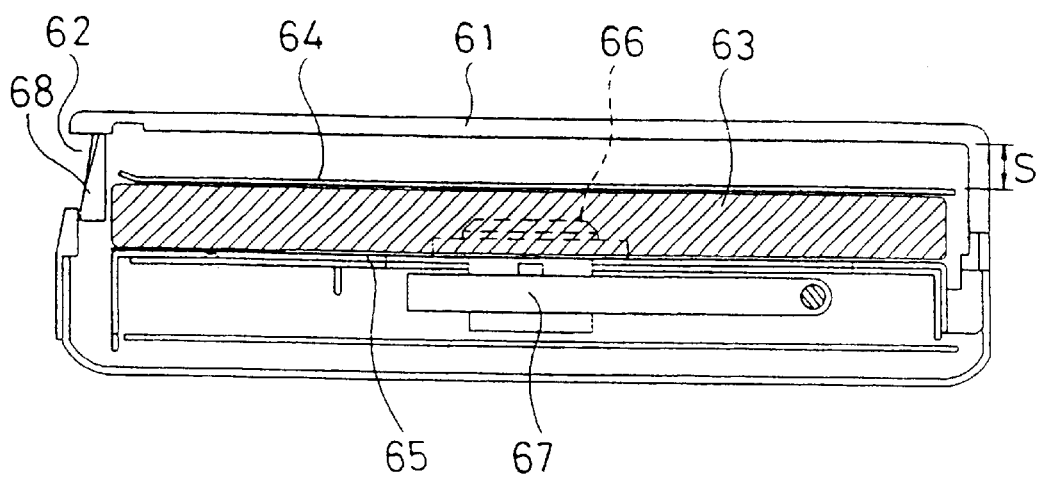
FIG. 15 is a sectional view of another conventional example.
Figure 15:
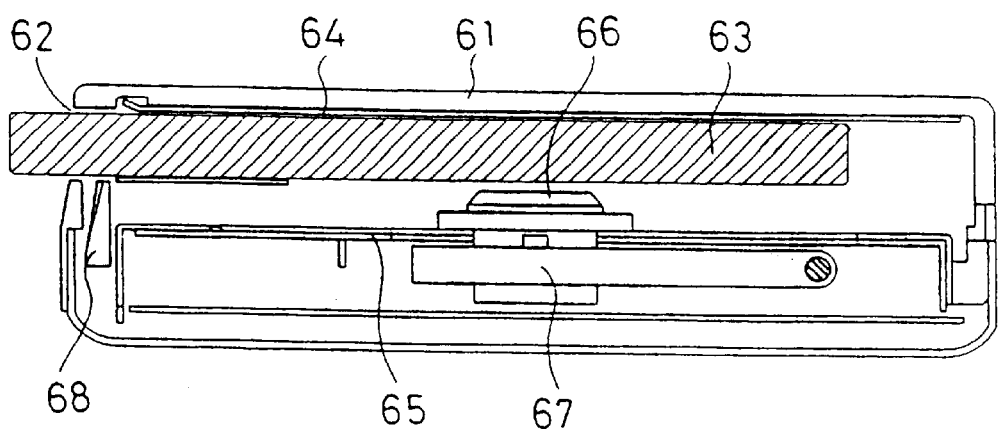

Before the cartridge 7 is loaded, the detection lever 37 is urged by the torsion coil spring 36c to lie at the position shown in FIG. 10. FIG. 13(a) is a schematic view showing the above-described state as seen from a rear surface (the direction shown by the arrow F—F' in FIG. 6). In FIG. 13, to easily distinguish the ascend and descend guide plate 30 from the slide plate 33, the slide plate 33, located closer to the front of the device, is hatched.

If the cartridge 7 is loaded in the state shown in FIGS. 8(a) and 9(a), it is pressed against a lip-shaped opening abutting portion G formed in the front cabinet 26 and in the insertion port cover 14 and having an inclined portion and is then pushed in as shown in FIG. 1(a). Then, the insertion port cover 14 is rotationally moved from the blocked position to the open position against the urging force of the torsion coil spring 40 to bring the tips of the support arms 14R and 14L of the insertion port cover 14 into abutment with the chassis 21, thereby raising an inlet side of the holder 6 upward as shown in FIG. 8(b).

At this time, the link angle 19 moves rotationally using as first support points H1, engaging portions between the notch portions 19c and 19d and the projections 38c and 38d of the intermediate cabinet 38. Further, the holder 6 has its rear portion supported in the attaching slits 21a in the chassis 21 via the link plates 18R and 18L. When the link angle 19 moves rotationally from the position in FIG. 8(a) to the position in FIG. 8(b), intermediate portions of the link plates 18R and 18L are pushed by the engaging pieces 19a and 19b of the link angle 19 and rotationally moved using as second support points H2, engaging portions between the rotation support shafts 24 of the link plates 18R an 18L and the attaching slits 21a in the chassis 21, so that in response to the rotational movement, the holder 6 ascends in parallel with the chassis 21 from the blocked position to the open position of the insertion port cover 14. The holder 6 is raised against the urging forces of the torsion coil springs 36a and 36b.

When the cartridge 7 is pushed into the holder 6 against the force of a spring portion 6d formed by cutting and raising the corresponding portion of the rear surface of the holder 6, upper edges of the front cabinet 26 are disengaged from the cartridge 7 to release a force applied by the cartridge 7 to open the insertion port cover 14. Consequently, the insertion port cover 14 is rotationally moved due to the urging force of the torsion coil spring 40, and the holder 6 with the cartridge 7 loaded therein is descended to the state shown in FIG. 12, due to the urging forces of the torsion coil springs 36a and 36b. In this state, the disk incorporated in the cartridge 7 is connected to the disk rotation driving mechanism 4 so that the optical pickup 5 can access the disk.

Figure 12:
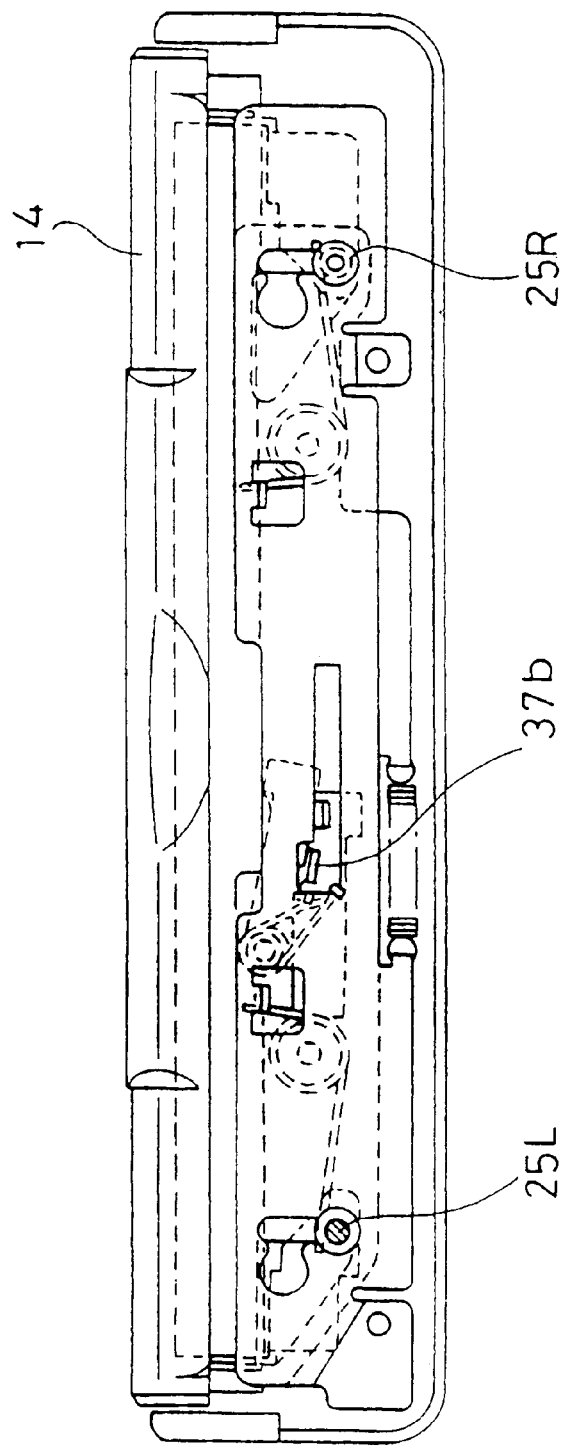
FIG. 12 is a front sectional view showing how the device appears after the cartridge has been inserted according to this embodiment.

In the state shown in FIG. 12, the detection lever 37 has its tip coming into abutment with the loaded cartridge 7 and moves rotationally against the urging force of the torsion coil spring 36c as shown in FIG. 13(b).

The detection lever 37 has an engaging projection 37b formed in its center by means of a folding operation and which penetrates an opening 33b in the center of the slide plate 33 and then passes through the lever inserting hole 29 in the ascend and descend guide plate 30. When the detection lever 37 is rotationally moved as shown in FIG. 12, it is disengaged from a stage portion 33c formed in a part of the opening 33b and the slide plate 33, urged by the torsion coil spring 34, slides a distance J in the direction shown by the arrow A from the state shown in FIG. 13(a), as shown in FIG. 13(b).

When the loaded cartridge 7 is removed, it is automatically discharged simply by operating the open operation button 26a of the front cabinet 26 in the direction opposite to that shown by the arrow A. This requires no cumbersome operation such as gripping and lifting the opposite side surfaces of the movable cabinet 1 as in the prior art.

Figure 11:
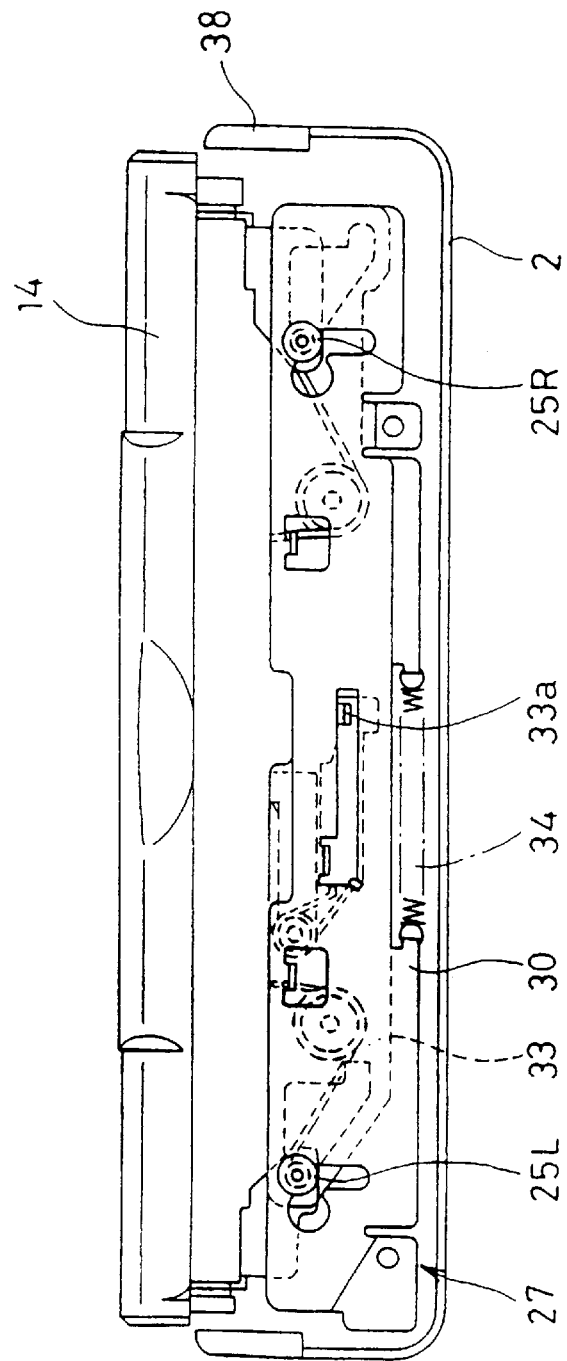
FIG. 11 is a front sectional view showing how an open operation button is operated after the cartridge has been inserted according to this embodiment.

In the state shown in FIG. 13(b), when the open operation button 26a is operated in the direction opposite to that shown by the arrow A, the urging force of the tensile coil spring 34 serves to introduce the state shown in FIG. 13(a). When the open operation button 26a is further operated, the holder guide shafts 25R and 25L of the holder 6 are pushed up, as shown in FIG. 11, along the vertical guide holes 28R and 28L in the ascend and descend guide plate 30 by means of the inclined sides 35 of the through-slots 33R and 33L in the slide plate 33, which moves in the direction opposite to that shown by the arrow A.

When the holder 6 is pushed up by the inclined sides 35 in the slide plate 33 against the urging forces of the torsion coil springs 36a and 36b, the tip of the support arm 14L of the insertion port cover 14 engages with the projection 38e of the intermediate cabinet 38 to rotationally move the insertion port cover 14 against the urging force of the torsion coil spring 40 as shown in FIG. 8(b). When the abutment between the rear surface of the front cabinet 26 and the cartridge 7 is cleared, the cartridge 7 is automatically discharged from the holder 6 due to the spring portion 6d of the holder 6 as shown in FIG. 1(a).

Furthermore, this embodiment is configured such that if the cartridge 7 is already loaded in the holder 6 and a user attempts to insert another cartridge into the holder 6, this operation is not accepted.

Specifically, before the cartridge 7 is loaded, the holder guide shafts 25R and 25L of the holder 6 are ready to ascend along the vertical guide slots 28R and 28L, respectively, as shown in FIG. 13(a), and as the cartridge 7 is loaded, the holder 6 ascends in parallel to open the insertion port cover 14. When the cartridge 7 is loaded, the detection lever 37 is disengaged from the stage portion 33c of the slide plate 33 to project stoppers 33d each formed in a part of the through-slot 33R or 33L in the slide plate 33, into the same path as that for the vertical guide slots 28R and 28L in the ascend and descend guide plate 30 as shown in FIG. 13(b). Thus, if an attempt is made to insert another cartridge, since the holder guide shafts 25R and 25L are abutted against the stoppers 33d of the slide plate 33 and prohibited from movement, the insertion port cover 14 cannot be opened, thereby preventing a cartridge from being inadvertently loaded in the holder with another cartridge already loaded therein.

Whether or not the cartridge 7 is loaded can be checked by checking the position of the open operation button 26a of the front cabinet 26. Specifically, FIG. 9(a) shows that the cartridge 7 is not loaded, while FIG. 9(b) shows that the cartridge 7 is loaded. When the cartridge 7 is loaded, the slide plate 33 slides the distance J relative to the ascend and descend guide plate 30 and the open operation button 26a connected to the operation lever 33a of the slide plate 33 also slides the distance J, as shown in FIG. 13. The sliding over the distance J causes an indicator 41, which has been hidden below the open operation button 26a, to appear to allow the user to assure that the cartridge is already loaded. A specific example of the indicator 41 is the coloring of a part of the front cabinet 26 such that the color of this part differs from that of the peripheries.

The disk rotation driving mechanism 4 and optical pickup 5 of this embodiment correspond to recording/reproducing means in the claims, and the body cabinet 2 and the bottom cover 39 and intermediate cabinet 38 constituting the body cabinet 2 correspond to a first cabinet in the claims. The movable cabinet 1 corresponds to a second cabinet in the claims.

The torsion coil springs 36a and 36b in this embodiment correspond to first urging means in the claims. The spring portion 6d in this embodiment corresponds to second cartridge-discharging urging means in the claims.

The insertion port cover 14 and torsion coil spring 40 in this embodiment correspond to an insertion port cover in the claims.

The support arms 14L and 14R formed in the insertion port cover 14 in this embodiment corresponds to cover opening means in the claims which moves the second cabinet to a second position to open a cover against an urging force of the first urging means which urges the second cabinet to a first position.

In the above described embodiment, the movable cabinet 1 as the second cabinet moves between the first position (FIG. 1(b)) where it is located closer to the body cabinet 2 as the first cabinet and the second position (FIG. 1(a)) where it is separated from the body cabinet 2, and the insertion port cover 14 attached to the movable cabinet 1 opens the insertion port 6c in the holder 6 when the movable cabinet 1 moves to the second position. The insertion port cover 14, however, is not essential, but the device may be configured such that a part of the body cabinet 2 blocks the insertion port 6c in the holder at the first position and such that the insertion port 6c in the holder 6 is opened when the movable cabinet 1 moves to the second position.

In the above described embodiment, the movable cabinet 1 as the second cabinet moves between the first position (FIG. 1(b)) where it is located closer to the body cabinet 2 as the first cabinet and the second position (FIG. 1(a)) where it is separated from the body cabinet 2, and the entire movable cabinet 1 is fitted inside the body cabinet 2 when the body cabinet 2 is located closer to the movable cabinet 1. Even when at least part of the movable cabinet 1 is fitted inside the body cabinet 2, the cabinets are thinner than in the prior art when the cartridge is not being loaded or removed for insertion or takeout, that is, when the cartridge is out of the device or has been completely loaded.

Since the above described embodiment comprises the MD player, the cartridge 7 comprises an MD cartridge. It may be an optical disk cartridge, a magnetic disk cartridge, or a tape cartridge for a cassette tape player.

What is claimed is:

1. A recording/reproducing device, comprising:
a cabinet having a side surface with an insertion port therein configured for receiving a cartridge slidably insertable therethrough, said device comprising:
a first cabinet having recording/reproducing means for holding a recording medium located in a cartridge;
a second cabinet having an exterior cabinet surface connected to the first cabinet for movement from a first position where the second cabinet is located closer to said first cabinet in a thickness direction thereof to a second position where the second cabinet is further separated from the first cabinet;
urging means for normally urging said second cabinet toward the first position where the second cabinet is located closer to the first cabinet;
opening means for moving said second cabinet in a direction in which the second cabinet moves from said first position to said second position against an urging force from said urging means; and
said insertion port for opening when said opening means separates the second cabinet from the first cabinet, so that a cartridge is insertable therethrough only when the opening means moves the second cabinet to the second position, wherein:
the insertion port comprises an insertion port cover for blocking the insertion port and for cooperating with said opening means to open the insertion port, and
the insertion port cover further comprises a lip-shaped opening abutting portion located therein and having an inclined portion which enables a cartridge to abut against and insert into the insertion port, and when a cartridge is directly abutted against and pushed into said opening abutting portion, the insertion port cover opens to allow a cartridge to be inserted thereinto.

2. The recording/reproducing device according to claim 1, wherein the second cabinet comprises a holder for moving integrally with the second cabinet so that a cartridge slidably inserted and set in said holder is movable with the holder and the second cabinet.

3. The recording/reproducing device according to claim 1, wherein the device further comprises detection means for detecting that a cartridge is housed in the first cabinet and locking means for locking said opening means using the detection means, thereby preventing another cartridge from being inserted when a cartridge is already housed in the first cabinet.

4. The recording/reproducing device according to claim 3, wherein a locked state of the opening means, established by the locking means while a cartridge is housed in the first cabinet, is cleared to open the insertion port only when the open operation button is operated for opening.

5. The recording/reproducing device according to claim 1, wherein the cabinet comprises an open operation button located on a side surface thereof and which cooperates with said opening means so that operation of the open operation button opens the insertion port.

6. The recording/reproducing device according to claim 5, wherein the device comprises detection means for detecting that a cartridge is housed in the first cabinet and locking means for locking said opening means using the detection means, and a position where the open operation button cooperating with the locked opening means is stopped, depending on whether or not a cartridge is housed in the first cabinet, so that status of presence of a cartridge is displayed on an insertion port surface depending on the stop position of the open operation button.

7. The recording/reproducing device according to claim 1, wherein said device further comprises a second cartridge-discharging urging means for urging a housed cartridge in a cartridge discharge direction so that when the opening means moves the second cabinet from the first position to the second position for separation, said second urging means discharges a housed cartridge.

8. A recording/reproducing device comprising:
a cabinet having a side member with an insertion port therein for receiving a cartridge slidably insertable therethrough, the insertion port having an attached opening and closing cover, said device comprising:
a first cabinet having recording/reproducing means for holding a recording medium located in a cartridge;
a second cabinet having an exterior cabinet surface attached to the first cabinet for movement between a first position where the second cabinet is located opposite and close to the recording/reproducing means of said first cabinet and a second position where the second cabinet is further separated from the recording/reproducing means;
a holder for moving integrally with said second cabinet to receive, at said second position, a cartridge inserted from an insertion port and transferring a cartridge to said first position, where a cartridge is subjected to recording/reproduction by means of the recording/reproducing means;
first urging means for urging said second cabinet and said holder to the first position where the second cabinet and the holder are located closer to the recording/reproducing means of the first cabinet and where a cartridge is subjected to recording/reproduction;
second cartridge-discharging urging means for urging a cartridge in a direction for discharging a cartridge from said holder;
an insertion port cover attached to the insertion port in said holder for urging in a direction in which the insertion port is blocked; and
cover opening means operative, for moving the second cabinet to the second position to open the cover against an urging force of said first urging means acting in a direction toward the first position of the second cabinet when said insertion port cover is released, wherein
after said opening means has opened the insertion port cover, when the second cabinet is at the second position, and when a cartridge is completely inserted, said first urging means applies an urging force to move the second cabinet to thereby close the insertion port cover.

* * * * *